Feb. 16, 1971     G. CREMER ET AL     3,562,879
APPARATUS FOR THE PRODUCTION OF DOUBLE-WALLED
PIPES OF CERAMIC MATERIAL Filed Feb. 23, 1966     8 Sheets-Sheet 1

Fig.1

PRIOR ART

INVENTORS:
GOTTFRIED CREMER,
HEINZ BEHRENS,
HANS JOACHIM DIETZSCH.

BY

ATT'YS.

Feb. 16, 1971   G. CREMER ET AL   3,562,879
APPARATUS FOR THE PRODUCTION OF DOUBLE-WALLED
PIPES OF CERAMIC MATERIAL
Filed Feb. 23, 1966   8 Sheets-Sheet 2

Fig.2

INVENTORS:

GOTTFRIED CREMER,
HEINZ BEHRENS,
HANS JOACHIM DIETZSCH

BY Fraser & Fraser

ATT'YS.

Fig. 4

Feb. 16, 1971  G. CREMER ET AL  3,562,879
APPARATUS FOR THE PRODUCTION OF DOUBLE-WALLED
PIPES OF CERAMIC MATERIAL
Filed Feb. 23, 1966  8 Sheets-Sheet 5

Fig. 5

INVENTORS:
GOTTFRIED CREMER,
HEINZ BEHRENS,
HANS JOACHIM DIETZSCH

BY Fraser & Fraser

ATT'YS.

INVENTORS:
GOTTFRIED CREMER,
HEINZ BEHRENS,
HANS JOACHIM DIETZSCH.

BY

ATT'YS.

Feb. 16, 1971  G. CREMER ET AL  3,562,879
APPARATUS FOR THE PRODUCTION OF DOUBLE-WALLED
PIPES OF CERAMIC MATERIAL
Filed Feb. 23, 1966  8 Sheets-Sheet 7

Fig. 8

INVENTORS:
GOTTFRIED CREMER,
HEINZ BEHRENS,
HANS JOACHIM DIETZSCH.

BY

ATTYS.

Feb. 16, 1971   G. CREMER ET AL   3,562,879
APPARATUS FOR THE PRODUCTION OF DOUBLE-WALLED
PIPES OF CERAMIC MATERIAL
Filed Feb. 23, 1966   8 Sheets-Sheet 8

Fig.9

INVENTORS:
GOTTFRIED CREMER,
HEINZ BEHRENS,
HANS JOACHIM DIETZSCH

BY [signature]

ATT'YS.

United States Patent Office 3,562,879
Patented Feb. 16, 1971

3,562,879
APPARATUS FOR THE PRODUCTION OF DOUBLE-WALLED PIPES OF CERAMIC MATERIAL
Gottfried Cremer, Junkersdorf, near Cologne, Steyrer Weg 6, Germany; Heinz Behrens, Junkersdorf, near Cologne, 19 am Weidenpesch, Germany; and Hans Joachim Dietzsch, 1 Rue Charles Monnard, Lausanne, Switzerland
Filed Feb. 23, 1966, Ser. No. 529,549
Claims priority, application Germany, Feb. 24, 1965, F 45,345; Apr. 15, 1965, B 81,491
Int. Cl. B28b 3/24, 3/26
U.S. Cl. 25—15     3 Claims

ABSTRACT OF THE DISCLOSURE

An extrusion press for producing double-walled pipes of ceramic material comprising an annular cylinder, an annular piston within the cylinder, and an extrusion nozzle within the annular cylinder comprising a plurality of cores suspended on radial suspending means.

---

The invention relates to a process for the production of double-walled pipes of ceramic material.

Such pipes possess outstanding properties, in particular high acid-resistance, which makes them particularly suitable for use for the conduction of faeces or other chemically aggressive fluids.

The ceramic body shows a very high crushing-strength, but on the other hand possesses only a comparatively low tensile strength. On this account such ceramic pipes must be constructed with relatively large wall thicknesses so soon as they are exposed to external loadings as is always the case, for example, when laying such pipes in the ground under streets.

From the large wall thicknesses of such pipes there results a great weight of the pipe sections which makes their laying relatively difficult and costly.

Moreover the manufacture of such pipes with large wall thicknesses obviously requires an increased expenditure of ceramic raw material which in itself again contributes to an increase of cost of the pipe lines.

It has already been attempted to avoid these disadvantages by making ceramic tubes not solid walled but double walled, in which the two walls are connected together by cross-pieces. Such a procedure carries with it the advantage that such pipes with the same expenditure in ceramic material have a significantly higher strength than the solid walled pipes usual hitherto; or that the weight in comparison with the weight of the pipes usual hitherto can be significantly reduced if the strengths required are restricted to those of the pipes usual hitherto. A further advantage of such double walled pipes consists in the fact that they are significantly more cheaply dried and fired than the comparable solid wall pipes.

Hitherto double walled pipes, the two walls of which are connected together by cross-pieces, have been made in such a way that a ceramic mass has been pressed by means of the press, for example an extruder of piston-press, through a suitably formed nozzle which gives the desired cross-section of the pipe. The nozzle in the known presses possesses a ring-slit which corresponds to the outer or the inner circumference of the pipe to be produced. The hollow spaces in the pipe wall are formed by cores which are held by distance pieces in the said ring-slit. In the production of double walled pipes from ceramic material by means of such a press it appears however that the finished pipes are not perfect. This comes from the fact that the distance- or holding-pieces for the cores cut into the extrusion mass which, after passing these cutting places, no longer join together intimately so that, in the finished pressed bodies textures remain which substantially diminish the tightness and strength of the finished double-walled pipe.

It is indeed possible to produce a definite connection of the cut extrusions of ceramic material after passing the cutting points partially by the application of very high pressures. But the highest pressures possible in practice themselves lead, as experience has shown, to a still not completely satisfactory result.

During investigations of the problem it was established that particularly disadvantageous large-area incisions have been brought about as in the previous presses by the distance- and holding-devices for the cores.

The invention has set itself the task of putting forward a process and a press for its performance with which it is possible to produce double walled pipes of ceramic material which no longer show the undesired textures with the disadvantages associated therewith.

The invention consequently starts from a process for the production of double walled pipes of ceramic material of which both walls are connected together by cross-pieces, by pressing out an extrusion mass through a nozzle which shows exit openings in a ring-shaped arrangement.

The characteristic of the process according to the invention is to be seen in the fact that when passing through the exit opening the individual strands arising from the extrusion mass will be displaced singly in all directions substantially vertical to the original forward movement of the extrusion mass with division into radial partial strands directed outwards which come together to form a pipe-shaped hollow space and combine, after renewed diversion in the extrusion mass supply direction, with the walls of the hollow spaces.

A press according to the invention for carrying out this process consists, in a way known in itself, of a press cylinder fed by a supply device such as a piston, a helix or the like, the exit nozzle of which shows exit openings in a ring-shaped arrangement and is characterized in that the exit nozzle is formed by a plate which shows boundary rings concentric to one another for laying down the outer surface of the outer wall or the inner surface of the inner wall of the double walled type and holes in the ring area between these two boundary rings, in front of which are arranged on the exit side between bodies leaving distances between themselves in the distance from the exit surface of the plate. It has been found surprisingly with the process according to the invention it is possible to avoid the apprehended "textures" in the finished double-walled pipe, because obviously the individual strands displaced outwardly substantially at right-angles to the direction of supply, that "texturesless" walls of the hollow space arise in the double-walled pipe. This can be traced to the fact that the ceramic mass during the first diversion has the possibility of expanding itself very strongly while in the second diversion a pressing together of this expanded ceramic mass takes place whereby obviously a practically "textureless" unification of the ceramic mass is achieved.

In the press according to the invention is preferably fixed, before each hole, a covering body by means of several distance-pieces distributed around the circumference of the covering body. In a further development of the invention the covering bodies can also be fixed to a hollow insert which shows lateral openings above the covering body. Thereby the insert carrying the covering body can completely penetrate the nozzle plate and be secured to it from above.

The holes can also, at least on their exit side, be secured with an inner thread in which an outer thread on the insert is screwed.

For preventing an annular space remaining between the thread connection and the insert end in the hole in the nozzle plate, the insert and the hole can be covered with a bush.

Therein it is expedient to secure the insert by means of a lock-nut.

For the carrying out of the process according to the invention a piston-press with a press-cylinder with a press-piston and a nozzle has shown itself particularly advantageous, a characteristic of which consists in the fact that the press-cylinder has a cylindrical insert which, with the cylinder walls, forms an annular cylinder space, in which the press-piston formed as an annular piston works, and that in the annular space remaining between the insert and the press-cylinder an annular nozzle is inserted.

Such a construction may be used independently of the embodiment of the nozzle described initially. In the known presses for the production of ceramic pipes the loaded mass emerges from a cylindrical nozzle which contains a core which determines the internal diameter of the pipe. The plastic mass must therefore during pressing pass the expansion device for this core which on its part is fixed to the press cylinder with a cross-piece. Thereby the flowing plastic mass, as already pointed out, is cut open at the cross-piece and the cut places must completely close themselves again after passing the cross-piece whereby no "burn-spots" or "textures" arise in the finished rough bodies.

These phenomena are particularly critical in the production of double-walled pipes, both walls of which are held together by cross-pieces. Here the danger of "texture" formation is still greater because obviously the corresponding core for the hollow spaces in the double walls of the pipes must be fixed in the press substratum. There is thus a very large number of "burn-spots" in the flowing extrusion so that it is impossible to exclude, by corresponding cross-section transcisions, unavoidable damaging effects in the form of splits or "textures."

If on the other hand the ring piston press just described is used the advantages that can be obtained even with the nozzles usual hitherto, obviously increase significantly if the nozzle is likewise formed according to the present invention. In the ring piston press as described the inner diameter of the ring piston is preferably smaller than the inner diameter of the innermost ring-shaped passage in the nozzle. The outer diameter of the ring piston is conveniently selected as larger than the exterior diameter of the outermost ring-shaped passage in the nozzle. The nozzle can be exchangeable. Obviously filler pieces can be fitted in the nozzle or the nozzle can be formed in the way characterized initially.

The invention will now be described with reference to the accompanying drawings which show an embodiment of the invention but in no restrictive sense.

Figure 1:
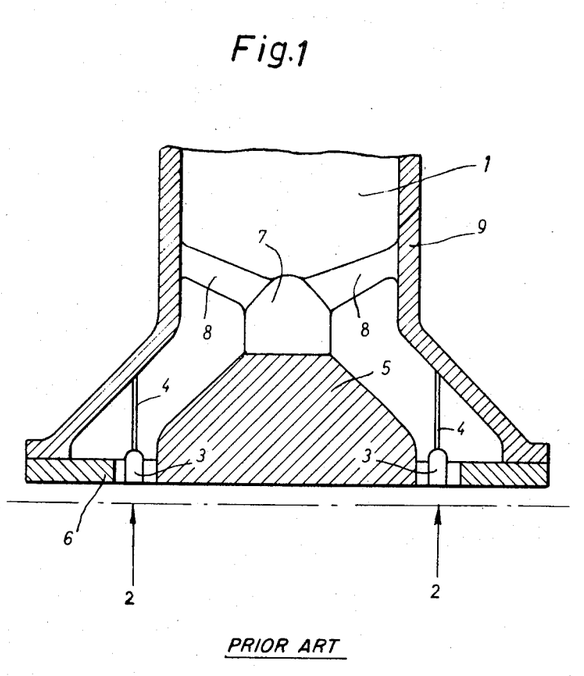
FIG. 1 shows a press nozzle of the pattern usual hitherto.

In the press nozzle shown in FIG. 1, belonging to the prior art, the ceramic mass to be deformed, indicated by the reference FIG. 1, is pressed by a helix (not shown) or by a piston, through an annular slit 2 in which are the cores 3 by which the pipe wall limited by the central core 5 and the outer limit 6 is provided with hollow spaces. The cores 3 are held by the suspension devices 4 while the central core 5 is fixed to the suspension device 7 which again is fixed by means of the arm 8 to the wall 9 of the nozzle.

In this nozzle construction the extrusion mass 1 is necessarily cut through once with a large surface by the arm 8 and again by the suspension devices 4, so that undesired "textures" arise in the finished double-walled pipe.

Figure 2:
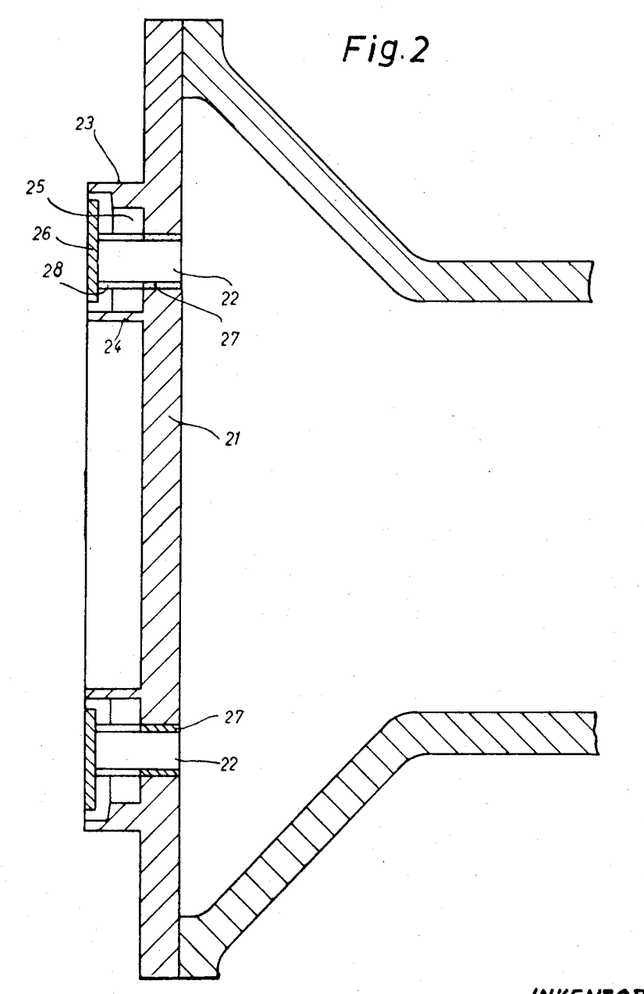
FIG. 2 shows a section through a press nozzle formed in accordance with the invention.

In the presses according to the invention the nozzle does not have, as in the known press, as is shown in FIG. 1, a central core, which must be held by a separate suspension device. There is on the contrary only a single self-supporting plate 21 provided which has holes 22 in a ring-shaped arrangement. In addition on the exit side of this plate there is an outer ring 23 and an inner ring 24 which define between themselves and that in the region of the holes 22, the annular area 25. The holes, in the embodiment reproduced, are covered by bodies in the form of plates allowing spaces between themselves which, as can be seen from FIG. 3, have, for example, a triangular shape with rounded corners. The plates 26 can be suspended in any desired way on the nozzle plate 21 but are preferably on a hollow insert 27 which is inserted in a hole 22 and has lateral 28 openings above the cover plates 26.

Figure 3:
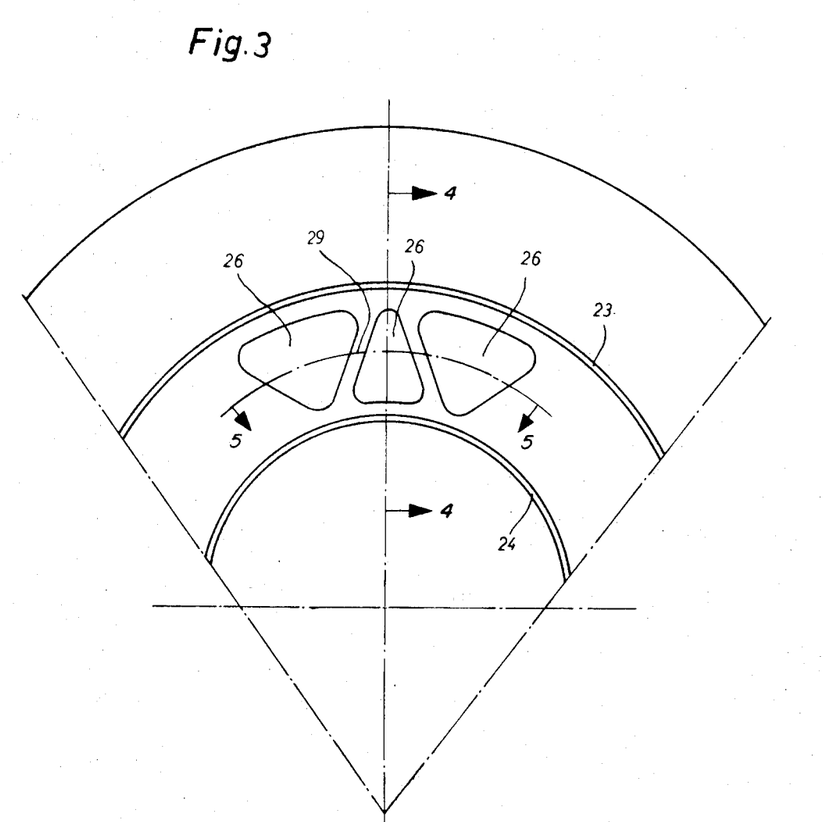
FIG. 3 shows a view from below of the press nozzle according to FIG. 2.
Figure 8:
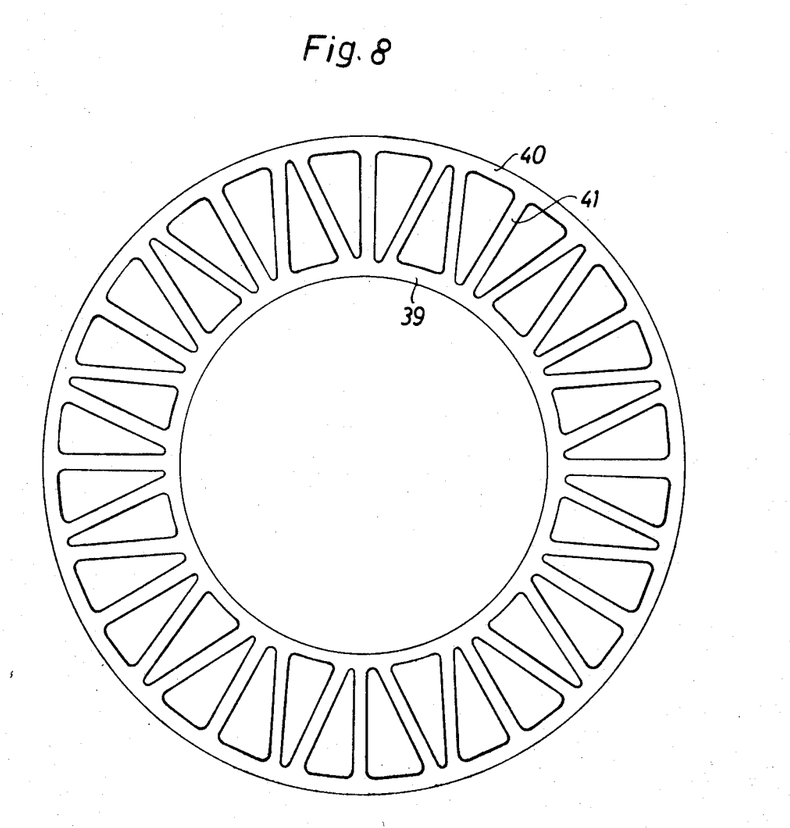
FIG. 8 shows a section through a double walled pipe as it may, for example, be produced according to the invention.

From FIG. 3 it can be seen that the annular arrangement of these covering bodies 26 produces the desired grid structure in the double-walled pipe between the two limiting rings 23 and 24. Such a double-walled pipe is shown by way of example also in FIG. 8 and from this figure may be seen the inner 39 and the outer wall 40 and the plurality of joining cross-pieces 41.

Figure 4:
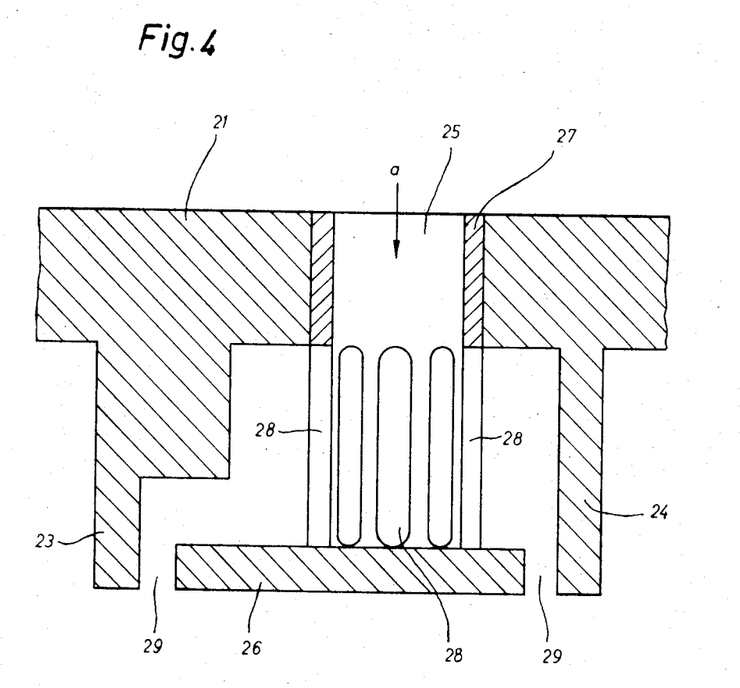
FIG. 4 shows a section through the nozzle according to FIGS. 2 and 3 substantially along the line 4—4.

FIG. 4 shows a radial section through the press nozzle. Again the plate 21 may be recognized with the limiting rings 23 and 24 and a hole 25 in which an insert 27 is inserted, of which the lateral exit openings 28 lie above the plate-shaped covering body and extend to the exit surface of the plate 21. The ceramic material enters in the direction of the arrow a (FIG. 4) into the insert 27 and leaves this insert through the openings 28 so that it encounters the ceramic material leaving the neighbouring insert. It then passes the annular slit 29 which can also be recognized from FIG. 3. It can also be recognized from the drawing that the exit cross-sections at the annular slit 28 are small with respect to the sum of the exit-cross-sections at the openings 29, whereby an inner recombination of the previously cutapart strands is guaranteed. In this connection reference may be made to the section according to FIG. 5 made in another direction from which it can be recognized how the ceramic mass leaving the exit openings 28 can recombine before the passage through the annular slit 29.

Obviously the horizontal plan form of the covering bodies 26 may be altered according to the desired structure of the connecting cross-pieces of the two pipe walls.

Figure 6:
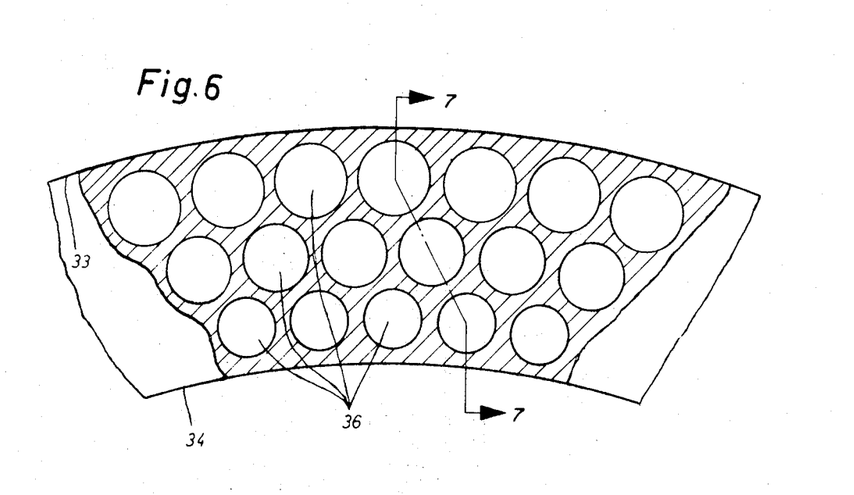
FIG. 6 shows a bottom fragmentary view of a modified embodiment of the invention comprising a series of formers or bodies arranged annularly within a press nozzle.
Figure 7:
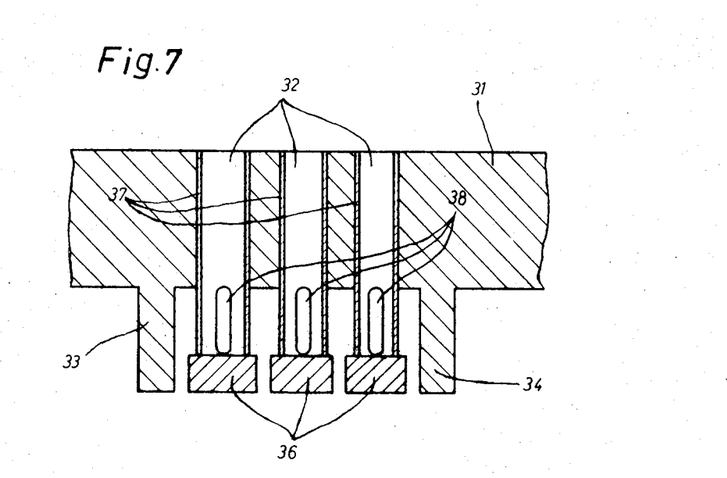
FIG. 7 shows a section through the press nozzle according to FIG. 6 substantially along the line 7—7.

For example a nozzle construction according to the principle of the invention can also be set up as is shown in FIGS. 6 and 7.

In this construction are provided, between the limiting rings 33 and 34, of which only the inner or the outer wall is shown in the drawing, several rows of holes 32 in which, as in the previously described embodiment, inserts 37 are inserted which can be plate-shaped covering bodies 36 above which in the inserts 37 openings 38 are provided. As can be recognized from FIG. 6 the plate-shaped covering bodies 36 in this embodiment show a circular ground plan.

Figure 5:
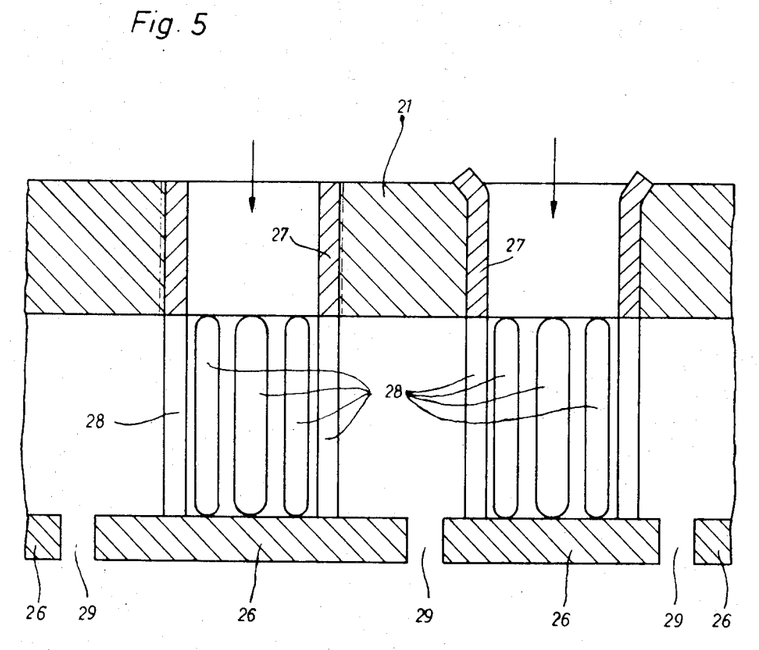
FIG. 5 shows a section through the nozzle according to FIGS. 2 and 3 substantially along the line 5—5.

The inserts, as can be seen from FIG. 5, can be expanded at their upper ends and thus fixed in the plate 21. They can also, as is likewise shown in FIG. 5 on the left side, be screwed into the plate 21 and as requisite secured by a lock-nut (not shown).

If the screw thread in plate 21 is not completely carried through so that the insert is only partially screwed into the plate, for the avoidance of an obstructive angular slit between the bottom of the thread in the plate 21 and the end of the threaded part in the insert 27, a bush is introduced into the hole and into the insert for covering this annular slit.

Figure 9:
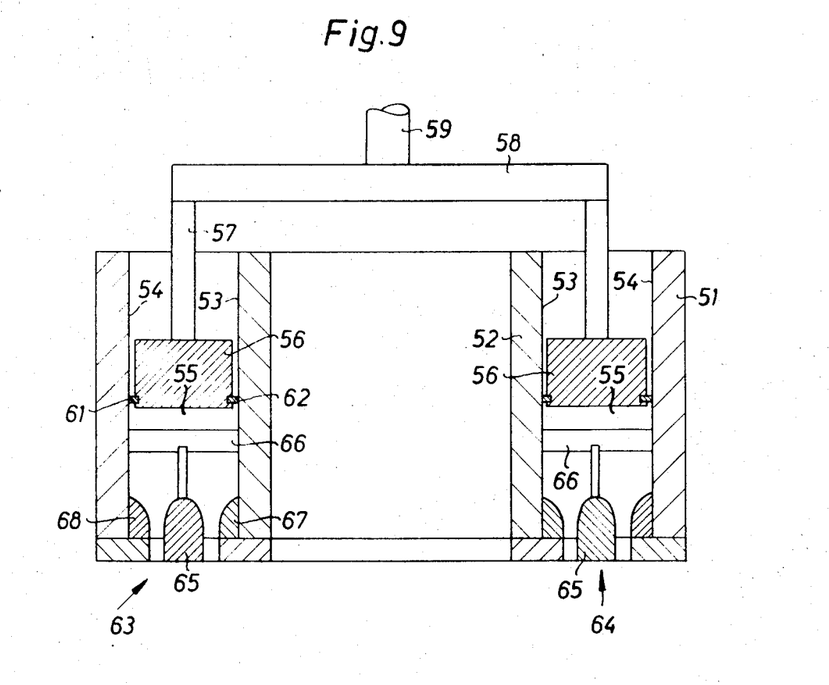
FIG. 9 shows a specially advantageous embodiment of a press according to the invention which may also be used independently of the nozzle according to FIGS. 2 and 3.

In the construction according to FIG. 9 the press cylinder is indicated by 51 which shows a cylindrical insert 52 which, together with the inner surface 54 of the press cylinder 51, forms a cylinder space 55 in which the press piston formed as ring-piston 56 works. The ring-piston 56 is connected to a cross-piece 58 by means of a closed ring 57 or alternatively by means of several circularly arranged rods, with which the piston rod 59 engages. At 61 may be seen an outer and at 62 an inner packing for the ring-piston 56. At 63 is designated a lower annular plate in which the nozzle 64 of the press according to the invention is fitted. In this nozzle are sunk in the embodiment reproduced as in the known construction according to FIG. 1, the cores 65, which are suspended on the suspension devices 66. By 67 or 68 filler pieces for the control of the flow process from the ring space 55 in the nozzle 64 are indicated.

Obviously, instead of the nozzle 64 and the filler pieces 67 and 68 nozzle constructions may be used as are shown in detail in FIGS. 2 to 7. In each case, by the use of the ring-piston according to 9, a more regular flow of the ceramic material through the exit openings in the nozzle 64 is ensured.

The nature of the filling of the ring space 55 below the ring-piston 56 is not shown in detail in FIG. 9. The filling can for example take place in a simple way in that before pressing the ring-piston 56 is removed for the time being and the annular space 55 is filled with the plastic mass to be pressed.

Moreover it is not specifically shown in the drawings how the venting or evacuation of the ceramic mass is undertaken if such a thing should appear to be necessary. This venting or evacuating is possible in a simple way by normal methods.

Even if the construction according to FIG. 9 is used in the manner shown without the use of the advantageous nozzles according to FIGS. 2 to 7, it appears that, when using known presses, for example according to FIG. 1, the formation of splits or "textures" does not arise. The reason for this probably lies in the fact that in consequence of the central dead space arising by means of the cylindrical insert the inflow of the mass into the nozzle 34 takes place in an exactly pre-determined controlled and symmetrical manner. The result would obviously be improved if the nozzle were formed in the manner shown in FIGS. 2 to 7.

We claim:
1. An extrusion press for the production of interconnected double-walled pipes of ceramic material comprising an annular press cylinder, an annular piston within said cylinder, an annular extrusion nozzle mounted at one end of said cylinder, said extrusion nozzle comprising a plurality of individual core units arranged in annular alignment within said nozzle and each core being suspended on respective individual radial suspending means within said cylinder.

2. A press as claimed in claim 1 in which the inner diameter of the annular piston is smaller than the innermost annular passage in said extrusion nozzle and the outer diameter of the annular piston is greater than the diameter of the outermost annular passage in said extrusion nozzle.

3. A press as claimed in 1 in which said extrusion nozzle comprises a plate, concentric limiting filler rings on said plate defining an annular region therebetween.

References Cited
UNITED STATES PATENTS

| | | | |
|---|---|---|---|
| 938,047 | 10/1909 | Fish | 25—17 |
| 2,908,037 | 10/1959 | Harkenrider | 25—17X |
| 3,274,315 | 9/1966 | Kawamura | 264—209X |
| 3,357,051 | 12/1967 | Zolotaievsky | 25—17X |
| 3,380,128 | 4/1968 | Cremer et al. | 25—17 |
| 3,406,435 | 10/1968 | Dietzsch | 25—17 |

FOREIGN PATENTS 26,263   11/1964   Japan.

CHARLES W. LANHAM, Primary Examiner

R. S. ANNEAR, Assistant Examiner

U.S. Cl. X.R.

25—17